__United States Patent Office__ 3,105,101
Patented Sept. 24, 1963

3,105,101
PURIFICATION OF ACETYLENE BY HYDRATION OF IMPURITIES USING A PHOSPHORIC ACID CATALYST
Robert J. Evans, Texas City, Tex., assignor to Monsanto Chemical Company, St. Louis, Mo., a corporation of Delaware
No Drawing. Filed May 22, 1961, Ser. No. 111,450
7 Claims. (Cl. 260—679)

This invention relates to a process for the purification of acetylene. More particularly, it relates to the treatment of an acetylene bearing gas to remove minor impurities, principally higher acetylenes and diolefins, from the gaseous mixture resulting from the pyrolysis of hydrocarbons to produce acetylene.

The primary starting materials for the production of acetylene are obtained from petroleum and the lower boiling consitituents thereof, namely, the normally gaseous hydrocarbons such as methane, ethane, or propane. The acetylene producing reaction is promoted by elevated temperatures and is endothermic in nature. In some acetylene processes, part of the heat required to maintain the reaction is supplied by pre-heating the hydrocarbon feed and the remainder is provided by introducing heated oxygen into the reaction zone for combustion with a portion of the feed. As the result, the effluent gases from the reaction zone are contaminated with large quantities of combustion products, essentially a mixture of carbon monoxide and carbon dioxide.

In addition to the aforementioned compounds, the reaction product gas also contains unconverted hydrocarbon feed and large amounts of hydrogen which are released in the reaction. The relative quantities of the various components which make up the reaction products will vary depending on the feed material and the conditions under which the pyrolysis reaction is carried out. In general, however, hydrogen and the combustion gases are largest in quantity followed by acetylene, unconverted feed, acetylene homologs and other impurities, but not necessarily in the order given. The thermodynamics and kinetics of the acetylene process are such that a number of higher acetylenes and olefins are produced. The more usual compounds formed along with acetylene and low-boiling olefins, such as ethylene, are the more highly unsaturated compounds such as, for example, methylacetylene, monovinylacetylene, diacetylene, vinylbiacetylene, allene and butadiene. The possible uses of a gas of such a heterogeneous nature are very few. Therefore, a large part of an acetylene plant is devoted to the handling and separation of the various gases mentioned.

It is particularly desirable to produce an acetylene gas free of the higher acetylene and diolefin impurities because the manufacture of various acetylene derivatives is hampered by the presence of such compounds.

These compounds are detrimental to the life of catalysts used in the manufacture of various products which require acetylene as a raw material, such as acrylonitrile and vinyl chloride, and also reduce the purity of these final products. Furthermore, these higher acetylenes and diolefins contribute to polymer formation and fouling in the acetylene purification system. Removing the polymer thus formed is a very costly operation. Research work has been conducted for many years to determine simple and economically attractive methods to minimize these problems caused by the higher acetylenes and diolefins.

There are known solvents and procedures available for the separation of acetylene from the other gaseous components of the mixture. The solvents most widely used today are dimethylformamide, butyrolactone and N-methyl pyrrolidone. However, the removal of many of the higher acetylenes and diolefins has always required special attention because their solubility characteristics closely resemble those of acetylene. In conventional practice, the higher acetylenes and diolefins are removed from the gaseous mixture independently of the acetylene itself. Frequently the solvent used to remove higher acetylenes and other impurities is the same as that used to absorb acetylene from the cracked gas stream. However, even when the same solvent is used for both purposes, separate systems for the recovery of the solvent for recirculation are required.

It has now been found that substantially all methylacetylene, monovinylacetylene, and allene can be removed selectively and biacetylene, vinylbiacetylene, and butadiene can be partially removed from an acetylene bearing gas stream by a hydration reaction over a phosphoric acid catalyst.

It is, therefore, the object of this invention to provide an improved process for the purification of acetylene. Another object of the invention is to provide an efficient and adequate means for removing impurities from an acetylene gas stream which have not been removed by the normal solvent absorption system. It is a further object of this invention to remove methylacetylene, monovinylacetylene and allene and other impurities from acetylene-bearing gas streams. Other objects will become apparent from the description of the invention which will be made in the following part of the specification.

According to this invention, the selective removal of substantially all of the methylacetylene, allene, and monovinylacetylene and a material portion of biacetylene, vinylbiacetylene, and butadiene from an acetylene-bearing gas stream is effected by passing the acetylene-bearing gas stream containing said compounds together with steam over a phosphoric acid catalyst supported on a carrier and washing the reaction products with water to recover a pure acetylene gas.

The present invention will be further described by means of the following illustrative examples, which are not to be considered as limitative of the invention but are merely presented to illustrate some aspects thereof.

*Example I*

A glass column 16 mm. in diameter was charged with 40 grams of a catalyst comprised of 60% phosphoric acid supported on kieselguhr pellets. The temperature of the catalyst bed was brought up to 200° C. by means of a heating coil and maintained at this temperature throughout the entire reaction. An acetylene stream containing 99.5 mol percent acetylene, 0.24 mol percent allene, 0.25 mol percent methylacetylene, 0.023 mol percent butadiene and trace amounts of monovinylacetylene was bubbled at a rate of 416 milliliters per minute at atmospheric pressure through a flask containing water at 60° C. such that the effluent gas from the water flask contained approximately 4 parts of acetylene to one part water vapor. This gas stream was then passed over the catalyst in the glass column where the allene and methylacetylene reacted to acetone and monovinylacetylene reacted to methylvinylketone. The product gas recovered from the reactor was water-washed to remove the reaction products. An analysis was run periodically during the 6 hour experiment to determine the amount of the impurities remaining in the acetylene gas stream. At the end of the experimental run, the product acetylene leaving the catalyst bed was found to contain only approximately 2% of the initial amount of allene present, 3% of the initial amount of methylacetylene present, 68% of the amount of butadiene initially present and no detectable amount of the monovinylacetylene. It was further determined that only about 0.5% of the acetylene had been hydrated to acetaldehyde. However, it was found that as the reaction temperature was raised, the acetylene converted to acetaldehyde increased.

*Example II*

In a 10-hour run identical to that in Example I and with the identical feed gas, it was found that at the end of the 10-hour period 98% of the allene was still being removed by the phosphoric acid catalyst, 97.5% of the methylacetylene was being removed, 36½% of the butadiene was being removed and all of the trace amount of monovinylacetylene was being removed. Again, it was determined that approximately 0.5% of the acetylene was being hydrated to acetaldehyde.

*Example III*

In a run using the same feed gas as in Example I and the identical reaction conditions except that the catalyst consisted of 40 grams of 50% by weight phosphoric acid adsorbed on carbon, it was determined that approximately 98% of the methylacetylene and allene were removed as water soluble reaction products and approximately 75% of the butadiene was removed. However, after about 250 hours of operation, the butadiene removal fell to about 25%.

*Example IV*

Using the identical equipment and procedure as in Example I, a cracked-gas acetylene stream containing 57% hydrogen, 26% carbon monoxide, 8% acetylene, 4% methane, 3% carbon dioxide, and various other minor impurities including methylacetylene, 50 p.p.m., allene, 140 p.p.m., monovinylacetylene, 200 p.p.m., biacetylene, 3300 p.p.m., vinylbiacetylene, 60 p.p.m., and butadiene, 100 p.p.m., was passed at a rate of 416 milliliters per minute together with steam in a ratio of 4 to 1 over a 60% by weight phosphoric acid catalyst on a kieselguhr carrier at 200° C. The reaction products were washed with water and an acetylene-bearing cracked-gas was recovered substantially free of methylacetylene, allene, and monovinylacetylene. Approximately 95% of the methylacetylene, allene, and monovinylacetylene was removed from the cracked-gas stream, approximately 25% of the butadiene was removed, 30% of the vinylbiacetylene was removed, and 20% of the biacetylene was removed.

It can be readily seen from the above examples that by means of a hydration reaction using a phosphoric acid catalyst, methylacetylene, allene, and monovinylacetylene impurities can be almost completely removed from an acetylene gas stream and butadiene, biacetylene, and vinylbiacetylene impurities can be decreased to a considerable extent.

This process has been concerned with the removal of small amounts of impurities from either a substantially pure acetylene gas stream or a very dilute acetylene-bearing cracked gas stream. These examples teach that one can utilize this invention to remove the higher acetylenes and diolefins from the manufactured acetylene-bearing gas stream immediately after the pyrolysis reaction or from the purified acetylene gas stream just prior to the acetylene being used in a subsequent manufacturing operation. Therefore, the scope of this invention covers the removal of these impurities from an acetylene-bearing gas stream at any point in the acetylene manufacturing and purification process.

The hydration reactions described above were conducted at a temperature of 200° C. Although temperature is a controlling factor in the process, temperatures from about 100° C. to about 400° C. can be employed in the practice of the invention. Low temperatures do not result in the removal of the desired quantities of higher acetylenes and diolefins while high temperatures are unsafe because of the acetylene explosion hazard. Within this appropriate range, however, the degree of impurity removal of acetaldehyde make can be balanced. In some cases it may be desirable to produce by-product acetaldehyde and this can be conveniently done by conducting this hydration reaction at about 300° C. or above.

The pressure, although maintained at atmospheric in the above examples, can be varied over a wide range. Pressures from atmospheric up to about 150 p.s.i.g. can be used in this process to accomplish the desirable feature of removing these impurities from an acetylene-bearing gas stream. Various amounts of steam also can be successfully utilized in this invention. The hydration reaction will proceed with steam in a ratio to the acetylene-bearing gas stream of from 1 to 10 to a ratio of about 10 to 1. However, the preferred ratio is from about 1 to 5 to about 2 to 1 for the most effective hydration reaction.

While kieselguhr and carbon were used as the carriers for the phosphoric acid catalyst in the examples cited and although they are preferred in the practice of this invention, other carriers such as alumina and clays can be used to hold the phosphoric acid for passage of the acetylene gas over it. Of course, it is possible to use the phosphoric acid in other forms. A fluidized bed reaction can be employed to remove these impurities from the acetylene gas stream or it is possible that a liquid phosphoric acid reaction kettle could be used to carry out this process. Although the catalyst pellets in the above examples were comprised of 60% by weight phosphoric acid, this proportion is not a critical amount. Under certain process conditions catalyst pellets may be most effective if they contain greater or lesser amounts of the phosphoric acid required to catalyze the reaction. Accordingly it is possible to employ catalyst pellets having from about 10% to about 90% by weight of phosphoric acid and remain within the scope of this invention.

The life of the catalyst used in this hydration reaction can be expected to be quite long based on the laboratory experiments. The catalyst life was found to be in excess of 600 hours when only a small amount of catalyst was used and a large quantity of acetylene gas passed over it with no decrease in the efficiency of impurity removal. This should lead to readily commercialization of the process of this invention.

The particular advantage of this invention can be readily seen by the fact that these impurities which are very difficult to remove from acetylene by conventional purification are now water-washed away in a very simple technique because of their chemical conversion to water-soluble products during this hydration reaction. This solves a very complicated and worrisome problem in the acetylene industry where an acetylene gas stream of the very highest purity is coming to be more and more in demand.

What is claimed is:

1. A process for removing higher acetylenes and diolefins from an acetylene-bearing gas stream containing a major proportion of acetylene and said impurities which comprises passing said acetylene-bearing gas stream together with steam over a phosphoric acid catalyst supported on a carrier and thereafter washing said stream with water and recovering the acetylene-bearing gas stream relatively free of said impurities.

2. A process for removing methylacetylene, allene, monovinylacetylene, biacetylene, vinylbiacetylene, and butadiene from an acetylene-bearing gas stream containing a major proportion of acetylene and said impurities which comprises passing said acetylene gas stream in combination with steam over a catalyst bed of phosphoric acid supported on a carrier and thereafter washing said stream with water and recovering the acetylene-bearing gas stream relatively free of said impurities.

3. The process as described in claim 2 wherein the amount of steam is from 10% of the acetylene-bearing gas stream to about 10 times the acetylene-bearing gas stream based on weight.

4. The process as described in claim 3 wherein the pressure is from atmospheric pressure to about 150 p.s.i.g.

and the temperature is from about 100° C. to about 400° C.

5. The process as described in claim 4 wherein the phosphoric acid catalyst is deposited on a carrier chosen from the group consisting of kieselguhr, carbon, clays and alumina.

6. The process as described in claim 5 wherein the phosphoric acid content of the catalyst is from about 10% to about 90% by weight.

7. A process for removing methylacetylene, allene and butadiene from an acetylene gas stream containing said impurities and at least 90% acetylene which comprises passing the acetylene gas stream together with steam in a ratio from about 1:2 to about 5:1 over a phosphoric acid catalyst supported on kieselguhr, said catalyst containing from about 25% to about 75% by weight of phosphoric acid and thereafter washing said stream with water and recovering acetylene relatively free of said impurities.

References Cited in the file of this patent
UNITED STATES PATENTS

| | | |
|---|---|---|
| 1,973,840 | Zobel et al. | Sept. 18, 1934 |
| 2,062,263 | Eberhardt | Nov. 24, 1936 |